United States Patent
Etchason

(10) Patent No.: US 10,948,052 B2
(45) Date of Patent: Mar. 16, 2021

(54) TRANSMISSION RANGE ADDER

(71) Applicant: ALLISON TRANSMISSION, INC., Indianapolis, IN (US)

(72) Inventor: Edmond M. Etchason, New Palestine (IN)

(73) Assignee: ALLISON TRANSMISSION, INC., Indianapolis, IN (US)

( * ) Notice: Subject to any disclaimer, the term of this patent is extended or adjusted under 35 U.S.C. 154(b) by 0 days.

(21) Appl. No.: 16/926,848

(22) Filed: Jul. 13, 2020

(65) Prior Publication Data

US 2021/0018070 A1 Jan. 21, 2021

Related U.S. Application Data

(60) Provisional application No. 62/921,919, filed on Jul. 15, 2019.

(51) Int. Cl.
*F16H 3/66* (2006.01)

(52) U.S. Cl.
CPC ..... *F16H 3/663* (2013.01); *F16H 2200/0047* (2013.01); *F16H 2200/0095* (2013.01); *F16H 2200/2007* (2013.01); *F16H 2200/2046* (2013.01)

(58) Field of Classification Search
CPC .... F16H 3/66; F16H 3/663; F16H 2200/0091; F16H 2200/2007; F16H 2200/2041; F16H 2200/2043; F16H 2200/2046; F16H 2200/0095
See application file for complete search history.

(56) References Cited

U.S. PATENT DOCUMENTS

| | | | |
|---|---|---|---|
| 10,378,616 B2* | 8/2019 | Warth | F16H 3/663 |
| 2007/0238573 A1 | 10/2007 | Kamm et al. | |
| 2008/0015077 A1 | 1/2008 | Kamm et al. | |
| 2008/0234093 A1 | 9/2008 | Diosi et al. | |
| 2011/0300987 A1 | 12/2011 | Diosi et al. | |
| 2014/0038767 A1* | 2/2014 | Koch | F16H 3/66 475/276 |
| 2014/0073745 A1* | 3/2014 | Bailey | B65D 65/466 525/411 |
| 2015/0133258 A1 | 5/2015 | Beck et al. | |
| 2016/0010728 A1* | 1/2016 | Scholz | F16H 3/663 475/276 |
| 2017/0175855 A1* | 6/2017 | Etchason | F16H 3/66 |
| 2017/0219053 A1* | 8/2017 | Yasuta | F16H 3/66 |

FOREIGN PATENT DOCUMENTS

DE 102014224089 A1 * 6/2016 ............... F16H 3/66

* cited by examiner

*Primary Examiner* — Stacey A Fluhart
(74) *Attorney, Agent, or Firm* — Taft Stettinius & Hollister LLP; Stephen F. Rost

(57) ABSTRACT

A multiple speed transmission includes an input shaft, an output shaft, a first planetary gearset having a first member, a second member, and a third member, and a second planetary gearset having a first member, a reaction member, a second member, a third member, and fourth member. The transmission also includes a plurality of interconnecting members each connected between at least one of the first and second planetary gearsets and at least another of the first and second planetary gearsets. The transmission includes a plurality of torque-transmitting mechanisms which are selectively engageable in combinations of at least two to establish a plurality of forward speed ratios and a plurality of reverse speed ratios between the input shaft and the output shaft.

20 Claims, 2 Drawing Sheets

US 10,948,052 B2

TRANSMISSION RANGE ADDER

RELATED DISCLOSURES

This application claims the benefit of U.S. Provisional Patent Application Ser. No. 62/921,919, filed Jul. 15, 2019, the disclosure of which is hereby incorporated by reference in its entirety.

FIELD OF THE DISCLOSURE

The present disclosure relates to a multiple speed transmission, and in particular to a multiple speed transmission capable of achieving multiple forward and reverse ranges or speeds.

BACKGROUND

Multiple speed transmissions use a number of friction clutches or brakes, planetary gearsets, shafts, and other elements to achieve a plurality of gear or speed ratios. The architecture, i.e., packaging or layout of the aforementioned elements, is determined based on cost, size, packaging constraints, and desired ratios. There is a need for new architectural designs of multiple speed transmissions for achieving different ratios with improved performance, cost, efficiency, responsiveness, and packaging.

SUMMARY

In a first embodiment of the present disclosure, a multiple speed transmission includes an input shaft; an output shaft; a first planetary gearset having a first member, a second member, and a third member; a second planetary gearset having a first member, a reaction member, a second member, a third member, and a fourth member; a plurality of interconnecting members each connected between at least one of the first and second planetary gearsets and at least another of the first and second planetary gearsets; a first torque-transmitting mechanism selectively engageable to interconnect the input shaft with the first member of the first planetary gearset; a second torque-transmitting mechanism selectively engageable to interconnect the input shaft with the third member of the first planetary gearset and the second member of the second planetary gearset; a third torque-transmitting mechanism selectively engageable to interconnect the third member of the first planetary gearset and the second member of the second planetary gearset with a stationary member; a fourth torque-transmitting mechanism selectively engageable to interconnect the third member of the second planetary gearset with the stationary member; a fifth torque-transmitting mechanism selectively engageable to interconnect the fourth member of the second planetary gearset with the stationary member; a sixth torque-transmitting mechanism selectively engageable to interconnect the reaction member of the second planetary gearset with the stationary member; wherein the torque transmitting mechanisms are selectively engageable in combinations of at least two; wherein, the selective engagement of two of the first, second, and third torque-transmitting mechanisms establishes X number of forward speed ratios and Y reverse speed ratios between the input and output shafts; further wherein, the selective engagement of one of the first and second torque-transmitting mechanisms and one of the fourth, fifth and sixth torque-transmitting mechanisms adds five additional forward speed ratios to X number of forward speed ratios and adds four reverse speed ratios to Y number of reverse speed ratios between the input shaft and the output shaft.

In one example of this embodiment, the output shaft is continuously interconnected with the second member of the first planetary gearset and the first member of the second planetary gearset. In a second example, the plurality of interconnecting members includes a first interconnecting member directly connected to the first member of the first planetary gearset. In a third example, the plurality of interconnecting members includes a second interconnecting member continuously interconnecting the third member of the first planetary gearset with the second member of the second planetary gearset. In a fourth example, the plurality of interconnecting members includes a third interconnecting member directly connected to the third member of the second planetary gearset.

In a fifth example, the plurality of interconnecting members includes a fourth interconnecting member directly connected to the fourth member of the second planetary gearset. In a sixth example, the plurality of interconnecting members includes a fifth interconnecting member directly connected to the reaction member of the second planetary gearset. In a seventh example, the second member of the second planetary gearset comprises a first set of pinion gears and a second set of pinion gears, where the first set of pinion gears meshes with the first member of the second planetary gearset and the second member of the second planetary gearset, and the second set of pinion gears meshes with the third member of the second planetary gearset and the reaction member of the second planetary gearset.

In an eighth example, the first planetary gearset is disposed within a transmission housing and the second planetary gearset is disposed within an add-on housing, the add-on housing being mounted to the transmission housing. In a ninth example, the first member of the first planetary gearset comprises an input to the first planetary gearset and the second member of the first planetary gearset comprises an output of the first planetary gearset; the first member of the second planetary gearset comprises an input to the second planetary gearset and the second member of the second planetary gearset comprises an output of the second planetary gearset; the output of the second planetary gearset is connected to the third member of the first planetary gearset to form a second input to the first planetary gearset.

In a further example, the first members of the first and second planetary gearsets and the reaction member of the second planetary gearset comprise sun gears; the second member of the first and second planetary gearsets comprise carrier members; and the third members of the first and second planetary gearsets and the fourth member of the second planetary gearset comprise ring gears.

In another embodiment of the present disclosure, a multiple speed transmission includes an input shaft; an output shaft; a first planetary gearset having a sun gear, a carrier member, and a ring gear; a second planetary gearset having a sun gear, a reaction member, a carrier member, a first ring gear, and a second ring gear; a plurality of interconnecting members each connected between at least one of the first and second planetary gearsets and at least another of the first and second planetary gearsets; a first torque-transmitting mechanism selectively engageable to interconnect the input shaft with the sun gear of the first planetary gearset; a second torque-transmitting mechanism selectively engageable to interconnect the input shaft with the ring gear of the first planetary gearset and the carrier member of the second planetary gearset; a third torque-transmitting mechanism selectively engageable to interconnect the ring gear of the first planetary gearset and the carrier member of the second planetary gearset with a stationary member; a fourth torque-transmitting mechanism selectively engageable to interconnect the first ring gear of the second planetary gearset with the stationary member; a fifth torque-transmitting mechanism selectively engageable to interconnect the second ring gear of the second planetary gearset with the stationary member; a sixth torque-transmitting mechanism selectively engageable to interconnect the reaction member of the second planetary gearset with the stationary member; wherein the torque transmitting mechanisms are selectively engageable in combinations of at least two; wherein, the selective engagement of two of the first, second, and third torque-transmitting mechanisms establishes X number of forward speed ratios and Y reverse speed ratios between the input and output shafts; further wherein, the selective engagement of one of the first and second torque-transmitting mechanisms and one of the fourth, fifth and sixth torque-transmitting mechanisms adds five additional forward speed ratios to X number of forward speed ratios and adds four reverse speed ratios to Y number of reverse speed ratios between the input shaft and the output shaft.

In one example of this embodiment, the output shaft is continuously interconnected with the carrier member of the first planetary gearset and the input member of the second planetary gearset. In a second example, the plurality of interconnecting members includes a first interconnecting member directly connected to the sun gear of the first planetary gearset. In a third example, the plurality of interconnecting members includes a second interconnecting member continuously interconnecting the ring gear of the first planetary gearset with the carrier member of the second planetary gearset.

In a fourth example, the plurality of interconnecting members includes a third interconnecting member directly connected to the first ring gear of the second planetary gearset. In a fifth example, the plurality of interconnecting members includes a fourth interconnecting member directly connected to the second ring gear of the second planetary gearset. In a sixth example, the plurality of interconnecting members includes a fifth interconnecting member directly connected to the reaction member of the second planetary gearset. In a seventh example, the carrier member of the second planetary gearset comprises a first set of pinion gears and a second set of pinion gears, where the first set of pinion gears meshes with the sun gear of the second planetary gearset and the first ring gear of the second planetary gearset, and the second set of pinion gears meshes with the second ring gear of the second planetary gearset and the reaction member of the second planetary gearset.

In another example, the sun gear of the first planetary gearset comprises an input to the first planetary gearset and the carrier member of the first planetary gearset comprises an output of the first planetary gearset; the sun gear of the second planetary gearset comprises an input to the second planetary gearset and the carrier member of the second planetary gearset comprises an output of the second planetary gearset; the output of the second planetary gearset is connected to the ring gear of the first planetary gearset to form a second input to the first planetary gearset.

BRIEF DESCRIPTION OF THE DRAWINGS

The above-mentioned aspects of the present disclosure and the manner of obtaining them will become more apparent and the disclosure itself will be better understood by reference to the following description of the embodiments of the disclosure, taken in conjunction with the accompanying drawings, wherein.

Corresponding reference numerals are used to indicate corresponding parts throughout the several views.

DETAILED DESCRIPTION

The embodiments of the present disclosure described below are not intended to be exhaustive or to limit the disclosure to the precise forms disclosed in the following detailed description. Rather, the embodiments are chosen and described so that others skilled in the art may appreciate and understand the principles and practices of the present disclosure.

Figure 1:
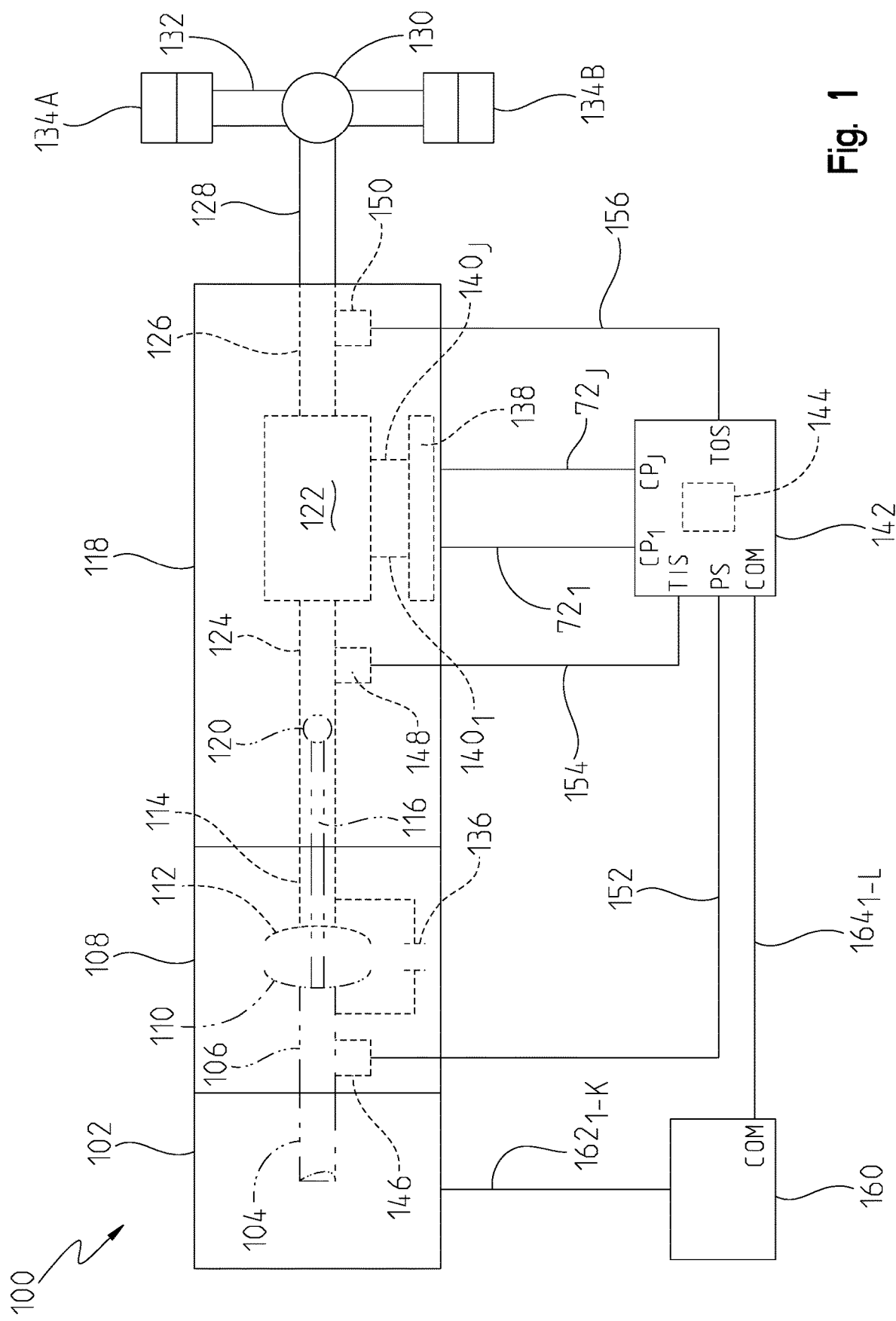
FIG. 1 is an exemplary block diagram and schematic view of one illustrative embodiment of a powered vehicular system.

Referring now to FIG. 1, a block diagram and schematic view of one illustrative embodiment of a vehicular system 100 having a drive unit 102 and transmission 118 is shown. In the illustrated embodiment, the drive unit 102 may include an internal combustion engine, diesel engine, electric motor, or other power-generating device. The drive unit 102 is configured to rotatably drive an output shaft 104 that is coupled to an input or pump shaft 106 of a conventional torque converter 108. The input or pump shaft 106 is coupled to an impeller or pump 110 that is rotatably driven by the output shaft 104 of the drive unit 102. The torque converter 108 further includes a turbine 112 that is coupled to a turbine shaft 114, and the turbine shaft 114 is coupled to, or integral with, a rotatable input shaft 124 of the transmission 118. The transmission 118 can also include an internal pump 120 for building pressure within different flow circuits (e.g., main circuit, lube circuit, etc.) of the transmission 118. The pump 120 can be driven by a shaft 116 that is coupled to the output shaft 104 of the drive unit 102. In this arrangement, the drive unit 102 can deliver torque to the shaft 116 for driving the pump 120 and building pressure within the different circuits of the transmission 118.

The transmission 118 can include a planetary gear system 122 having a number of automatically selected gears. An output shaft 126 of the transmission 118 is coupled to or integral with, and rotatably drives, a propeller shaft 128 that is coupled to a conventional universal joint 130. The universal joint 130 is coupled to, and rotatably drives, an axle 132 having wheels 134A and 134B mounted thereto at each end. The output shaft 126 of the transmission 118 drives the wheels 134A and 134B in a conventional manner via the propeller shaft 128, universal joint 130 and axle 132.

A conventional lockup clutch 136 is connected between the pump 110 and the turbine 112 of the torque converter 108. The operation of the torque converter 108 is conventional in that the torque converter 108 is operable in a so-called "torque converter" mode during certain operating conditions such as vehicle launch, low speed and certain gear shifting conditions. In the torque converter mode, the lockup clutch 136 is disengaged and the pump 110 rotates at the rotational speed of the drive unit output shaft 104 while the turbine 112 is rotatably actuated by the pump 110 through a fluid (not shown) interposed between the pump 110 and the turbine 112. In this operational mode, torque multiplication occurs through the fluid coupling such that the turbine shaft 114 is exposed to drive more torque than is being supplied by the drive unit 102, as is known in the art.

The torque converter 108 is alternatively operable in a so-called "lockup" mode during other operating conditions, such as when certain gears of the planetary gear system 122 of the transmission 118 are engaged. In the lockup mode, the lockup clutch 136 is engaged and the pump 110 is thereby secured directly to the turbine 112 so that the drive unit output shaft 104 is directly coupled to the input shaft 124 of the transmission 118, as is also known in the art.

The transmission 118 further includes an electro-hydraulic system 138 that is fluidly coupled to the planetary gear system 122 via a number, J, of fluid paths, $140_1$-$140_J$, where J may be any positive integer. The electro-hydraulic system 138 is responsive to control signals to selectively cause fluid to flow through one or more of the fluid paths, $140_1$-$140_J$, to thereby control operation, i.e., engagement and disengagement, of a plurality of corresponding friction devices in the planetary gear system 122. The plurality of friction devices may include, but are not limited to, one or more conventional brake devices, one or more torque transmitting devices, and the like. Generally, the operation, i.e., engagement and disengagement, of the plurality of friction devices is controlled by selectively controlling the friction applied by each of the plurality of friction devices, such as by controlling fluid pressure to each of the friction devices. In one example embodiment, which is not intended to be limiting in any way, the plurality of friction devices include a plurality of brake and torque transmitting devices in the form of conventional clutches that may each be controllably engaged and disengaged via fluid pressure supplied by the electro-hydraulic system 138. In any case, changing or shifting between the various gears of the transmission 118 is accomplished in a conventional manner by selectively controlling the plurality of friction devices via control of fluid pressure within the number of fluid paths $140_1$-$140_J$.

The system 100 further includes a transmission control circuit 142 that can include a memory unit 144. The transmission control circuit 142 is illustratively microprocessor-based, and the memory unit 144 generally includes instructions stored therein that are executable by a processor of the transmission control circuit 142 to control operation of the torque converter 108 and operation of the transmission 118, i.e., shifting between the various gears of the planetary gear system 122. It will be understood, however, that this disclosure contemplates other embodiments in which the transmission control circuit 142 is not microprocessor-based, but is configured to control operation of the torque converter 108 and/or transmission 118 based on one or more sets of hardwired instructions and/or software instructions stored in the memory unit 144.

In the system 100 illustrated in FIG. 1, the torque converter 108 and the transmission 118 include a number of sensors configured to produce sensor signals that are indicative of one or more operating states of the torque converter 108 and transmission 118, respectively. For example, the torque converter 108 illustratively includes a conventional speed sensor 146 that is positioned and configured to produce a speed signal corresponding to the rotational speed of the pump shaft 106, which is the same rotational speed of the output shaft 104 of the drive unit 102. The speed sensor 146 is electrically connected to a pump speed input, PS, of the transmission control circuit 142 via a signal path 152, and the transmission control circuit 142 is operable to process the speed signal produced by the speed sensor 146 in a conventional manner to determine the rotational speed of the pump shaft 106/drive unit output shaft 104.

The transmission 118 illustratively includes another conventional speed sensor 148 that is positioned and configured to produce a speed signal corresponding to the rotational speed of the transmission input shaft 124, which is the same rotational speed as the turbine shaft 114. The input shaft 124 of the transmission 118 is directly coupled to, or integral with, the turbine shaft 114, and the speed sensor 148 may alternatively be positioned and configured to produce a speed signal corresponding to the rotational speed of the turbine shaft 114. In any case, the speed sensor 148 is electrically connected to a transmission input shaft speed input, TIS, of the transmission control circuit 142 via a signal path 154, and the transmission control circuit 142 is operable to process the speed signal produced by the speed sensor 148 in a conventional manner to determine the rotational speed of the turbine shaft 114/transmission input shaft 124.

The transmission 118 further includes yet another speed sensor 150 that is positioned and configured to produce a speed signal corresponding to the rotational speed of the output shaft 126 of the transmission 118. The speed sensor 150 may be conventional, and is electrically connected to a transmission output shaft speed input, TOS, of the transmission control circuit 142 via a signal path 156. The transmission control circuit 142 is configured to process the speed signal produced by the speed sensor 150 in a conventional manner to determine the rotational speed of the transmission output shaft 126.

In the illustrated embodiment, the transmission 118 further includes one or more actuators configured to control various operations within the transmission 118. For example, the electro-hydraulic system 138 described herein illustratively includes a number of actuators, e.g., conventional solenoids or other conventional actuators, that are electrically connected to a number, J, of control outputs, $CP_1$-$CP_J$, of the transmission control circuit 142 via a corresponding number of signal paths $72_1$-$72_J$, where J may be any positive integer as described above. The actuators within the electro-hydraulic system 138 are each responsive to a corresponding one of the control signals, $CP_1$-$CP_J$, produced by the transmission control circuit 142 on one of the corresponding signal paths $72_1$-$72_J$ to control the friction applied by each of the plurality of friction devices by controlling the pressure of fluid within one or more corresponding fluid passageway $140_1$-$140_J$, and thus control the operation, i.e., engaging and disengaging, of one or more corresponding friction devices, based on information provided by the various speed sensors 146, 148, and/or 150.

The friction devices of the planetary gear system 122 are illustratively controlled by hydraulic fluid which is distributed by the electro-hydraulic system in a conventional manner. For example, the electro-hydraulic system 138 illustratively includes a conventional hydraulic positive displacement pump (not shown) which distributes fluid to the one or more friction devices via control of the one or more actuators within the electro-hydraulic system 138. In this embodiment, the control signals, $CP_1$-$CP_J$, are illustratively analog friction device pressure commands to which the one or more actuators are responsive to control the hydraulic pressure to the one or more frictions devices. It will be understood, however, that the friction applied by each of the plurality of friction devices may alternatively be controlled in accordance with other conventional friction device control structures and techniques, and such other conventional friction device control structures and techniques are contemplated by this disclosure. In any case, however, the analog operation of each of the friction devices is controlled by the control circuit 142 in accordance with instructions stored in the memory unit 144.

In the illustrated embodiment, the system 100 further includes a drive unit control circuit 160 having an input/output port (I/O) that is electrically coupled to the drive unit 102 via a number, K, of signal paths 162, wherein K may be any positive integer. The drive unit control circuit 160 may be conventional, and is operable to control and manage the overall operation of the drive unit 102. The drive unit control circuit 160 further includes a communication port, COM, which is electrically connected to a similar communication port, COM, of the transmission control circuit 142 via a number, L, of signal paths 164, wherein L may be any positive integer. The one or more signal paths 164 are typically referred to collectively as a data link. Generally, the drive unit control circuit 160 and the transmission control circuit 142 are operable to share information via the one or more signal paths 164 in a conventional manner. In one embodiment, for example, the drive unit control circuit 160 and transmission control circuit 142 are operable to share information via the one or more signal paths 164 in the form of one or more messages in accordance with a society of automotive engineers (SAE) J-1939 communications protocol, although this disclosure contemplates other embodiments in which the drive unit control circuit 160 and the transmission control circuit 142 are operable to share information via the one or more signal paths 164 in accordance with one or more other conventional communication protocols (e.g., from a conventional databus such as J1587 data bus, J1939 data bus, IESCAN data bus, GMLAN, Mercedes PT-CAN).

Figure 2:
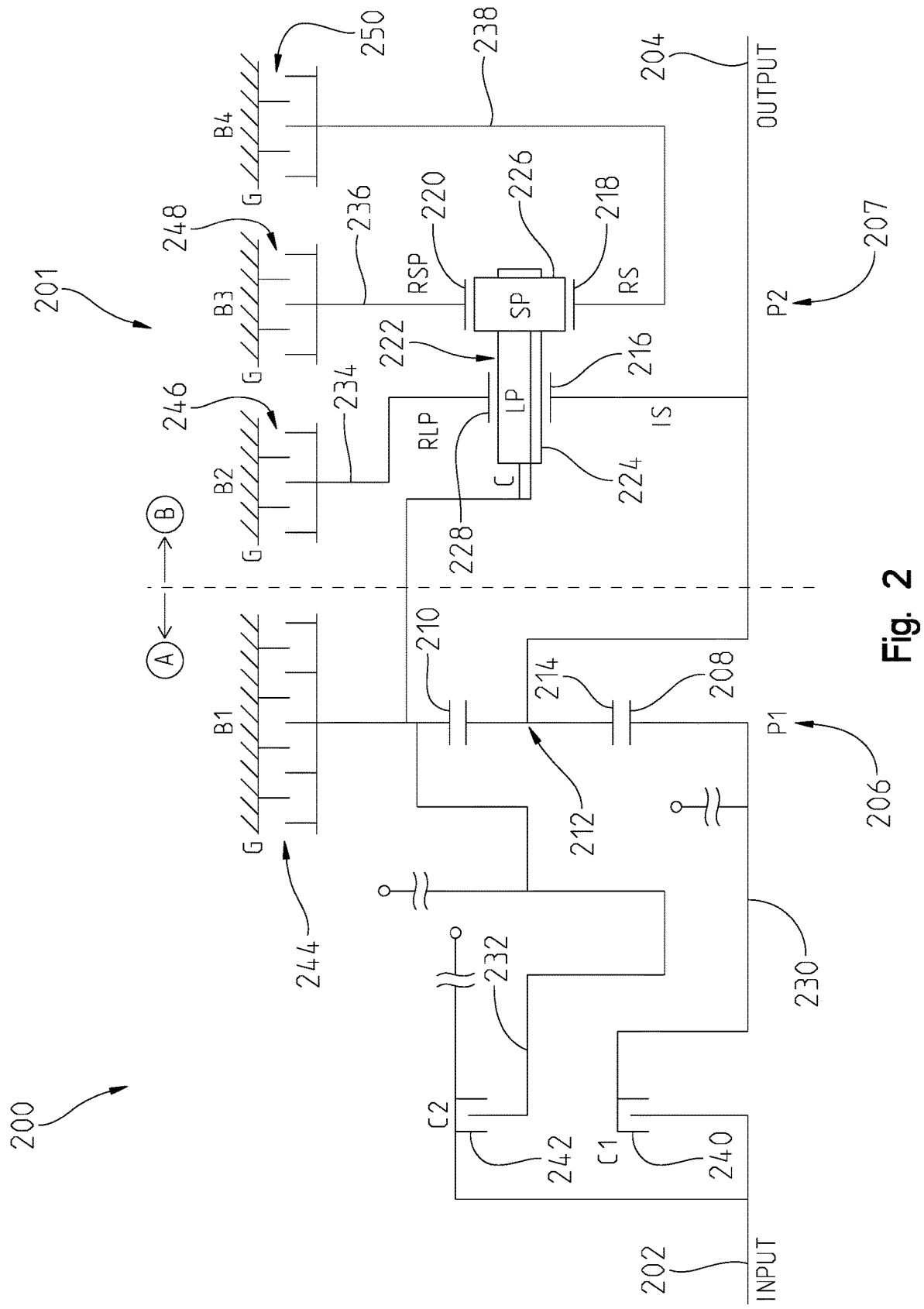
FIG. 2 is a diagrammatic view of a first embodiment of a transmission range adder.

Referring to FIG. 2, a schematic representation or stick diagram illustrates one embodiment of a multi-speed transmission 200 according to the present disclosure. The transmission 200 includes an input shaft 202 and an output shaft 204. The input shaft 202 and output shaft 204 can be disposed along the same axis or centerline of the transmission 200. In another aspect, the different shafts can be disposed along different axes or centerlines. In a further aspect, the different shafts can be disposed parallel to one another, but along different axes or centerlines. Other aspects can be appreciated by one skilled in the art.

The transmission 200 can also include a plurality of planetary gearsets. In the illustrated embodiment of FIG. 2, the transmission 200 may include at least a first planetary gearset 206 and a second planetary gearset 207. Each planetary gearset can be referred to as a simple or compound planetary gearset. For example, in some aspects, one or more of the plurality of planetary gearsets can be formed as an idler planetary gearset or a Ravigneaux gearset. In FIG. 2, however, the first planetary gearset 206 is formed as a simple planetary gearset and the second planetary gearset 207 is formed as a Ravigneaux gearset.

One or more of the plurality of planetary gearsets can be arranged in different locations within the transmission 200, but for sake of simplicity and in this particular example only, the planetary gearsets are aligned in an axial direction consecutively in sequence (i.e., first, second, etc. between the input and output shafts).

The transmission 200 may also include a plurality of torque-transmitting or gearshifting mechanisms. For example, one or more of these mechanisms can include a clutch or brake. In one aspect, each of the plurality of mechanisms is disposed within an outer housing of the transmission 200. In another aspect, however, one or more of the mechanisms may be disposed outside of the housing. Each of the plurality of mechanisms can be coupled to one or more of the plurality of planetary gearsets, which will be described further below.

In the embodiment of FIG. 2, the transmission 200 can include a first torque-transmitting mechanism 240 and a second torque-transmitting mechanism 242 that are configured to function as clutches. These can be shiftable friction-locked multi-disk clutches, shiftable form-locking claw or conical clutches, wet clutches, or any other known form of a clutch. The transmission 200 can also include a third torque-transmitting mechanism 244, a fourth torque-transmitting mechanism 246, a fifth torque-transmitting mechanism 248, and a sixth torque-transmitting mechanism 250 that are configured to function as brakes (e.g., the torque-transmitting mechanism is fixedly coupled to the outer housing of the transmission 200). Each brake can be configured as a shiftable-friction-locked disk brake, shiftable friction-locked band brake, shiftable form-locking claw or conical brake, or any other type of known brake. With these six torque-transmitting mechanisms, selective shifting of at least seven forward gears and at least one reverse gear is possible.

The transmission 200 of FIG. 2 may also include seven or more different shafts, which is inclusive of the input shaft 202 and output shaft 204. Each of these shafts, designated as a first shaft 230, a second shaft 232, a third shaft 234, a fourth shaft 236, and a fifth shaft 238 are configured to be connected to one or more of the plurality of planetary gearsets or plurality of torque-transmitting mechanism between the input shaft 202 and output shaft 204. Further, in FIG. 2, the symbol refers to the corresponding shaft not ending but rather possibly connecting to another component such as an additional torque-transmitting mechanism, planetary gearset, or the like, including the components that rotate the first planetary gearset carrier in reverse.

In FIG. 2, the first planetary gearset 206 can include a first sun gear 208, a first ring gear 210, and a first carrier member 212 that rotatably supports a set of pinion gears 214.

The second planetary gearset 207, which is a compound planetary or Ravigneaux-type gearset, can include an input sun gear (IS) 216, a reaction sun gear (RS) 218, a second ring gear (RSP) 220, a third ring gear (RLP) 228 and a second carrier member 222 that rotatably supports a first set of pinion gears 224 and a second set of pinion gears 226. In one example, the first set of pinion gears 224 may be referred to as long pinion gears and the second set of pinion gears 226 may be referred to as short pinion gears. In at least one example, the long pinion gears have a greater dimension defined as a length than the short pinion gears. The first and second sets of pinion gears may mesh with one another. Moreover, the input sun gear 216 and the third ring gear 228 mesh with the first set of pinion gears 224, whereas the reaction sun gear 218 and second ring gear 220 mesh with the second set of pinion gears 226.

In the second planetary gearset, the second ring gear 220 is selectively coupled to the transmission housing (G) via the fifth torque-transmitting mechanism 248, the third ring gear 228 is selectively coupled to the transmission housing (G) via the fourth torque-transmitting mechanism 246, and the reaction sun gear 218 is selectively coupled to the transmission housing (G) via the sixth torque-transmitting mechanism 250.

The transmission 200 of FIG. 2 is capable of transferring torque from the input shaft 202 to the output shaft 204 in a plurality of forward gears or ratios and at least one reverse gear or ratio. Each of the forward torque ratios and the reverse torque ratios can be attained by the selective engagement of two of the torque-transmitting mechanisms (i.e., torque-transmitting mechanisms 240, 242, 244, 246, 248, 250). Those skilled in the art will readily understand that a different speed ratio is associated with each torque ratio.

As for the transmission 200, kinematic coupling of the first planetary gearset 206 is shown in FIG. 2. The first sun gear 208 is coupled to the first shaft 230 for common rotation therewith. The first carrier member 212 is coupled to the output shaft 204 and the input sun gear 216 for common rotation therewith. First ring gear 210 is coupled for common rotation with the second shaft 232 and the second carrier member 222.

With respect to the second planetary gearset 207, the input sun gear 216 is coupled to the output shaft 204 and the first carrier member 212 for common rotation therewith. The second ring gear 220 is coupled to the fourth shaft 236 for common rotation therewith. The reaction sun gear 218 is coupled to the fifth shaft 238 for common rotation therewith. The third ring gear 228 is coupled to the third shaft 234 for common rotation therewith. The first set of pinion gears 224 are configured to intermesh with the input sun gear 216 and the third ring gear 228, and the second set of pinion gears 226 are configured to intermesh with the reaction sun gear 218 and the second ring gear 220.

With regards to the kinematic coupling of the six torque-transmitting mechanisms to the previously described shafts, the multiple speed transmission 200 of FIG. 2 provides that the first torque-transmitting mechanism 240 is arranged within the power flow between at least the input shaft 202 and the first shaft 230 and the first sun gear 208. In this manner, the first torque-transmitting mechanism 240 is configured to act as a clutch. The second torque-transmitting mechanism 242 is arranged within the power flow between at least the input shaft 202 and the second shaft 232, the first ring gear 210, and the second carrier member 222. In this manner, the second torque-transmitting mechanism 242 is configured to act as a clutch. In this embodiment of the transmission 200 therefore two of the six torque-transmitting mechanisms are configured to act as a clutch and the other four torque-transmitting mechanisms are configured to act as brakes.

The third torque-transmitting mechanism 244, for example, is arranged within the power flow between the second shaft 232, the first ring gear 210, and the second carrier member 222 and the stationary transmission housing, G. The fourth torque-transmitting mechanism 246 is arranged within the power flow between the third shaft 234 and the third ring gear 228 and the stationary transmission housing, G. Moreover, the fifth torque-transmitting mechanism 248 is arranged within the power flow between the fourth shaft 236 and the second ring gear 220 and the stationary transmission housing, G. Lastly, the sixth torque-transmitting mechanism 250 is arranged within the power flow between the fifth shaft 238 and the reaction sun gear 218 and the stationary transmission housing, G.

The kinematic couplings of the embodiment in FIG. 2 can further be described with respect to the selective engagement of the torque-transmitting mechanisms with respect to one or more components of the plurality of planetary gearsets. For example, in the transmission 200, the first torque-transmitting mechanism 240 is selectively engageable to couple the input shaft 202 to the first shaft 230 and the first sun gear 208. The second torque-transmitting mechanism 242 is selectively engageable to couple the input shaft 202 to the second shaft 232, the first ring gear 210, and the second carrier member 222.

Moreover, the third torque-transmitting mechanism 244 is selectively engageable to couple second shaft 232, the first ring gear 210, and the second carrier member 222 to the housing G of the transmission 200. The fourth torque-transmitting mechanism 246 is selectively engageable to couple third shaft 234 and the third ring gear 228 to the housing G of the transmission 200. Further, the fifth torque-transmitting mechanism 248 is selectively engageable to couple the fourth shaft 236 and the second ring gear 220 to the housing G of the transmission 200. Lastly, the sixth torque-transmitting mechanism 250 is selectively engageable to couple the fifth shaft 238 and the reaction sun gear 218 to the housing G of the transmission 200.

In the present disclosure, the transmission incorporates compounding to achieve additional ranges or ratios. Compounding in this context involves connecting two or more members of one planetary gearset to two or more members of another planetary gearset with yet another member serving as a reaction member for the geartrain. Compounding provides gear ratios that are otherwise unattainable in a simple planetary gearset (i.e., one sun gear, one ring gear, and one carrier member). This compounding, however, is not simply connecting different gearsets in series. The output of the first gearset is generally the input to the second gearset. The output of the second gearset may then be fed back to what normally may have been the reaction member of the first gearset. The new reaction member for the geartrain is in the second planetary gearset. The resulting gear ratio may differ from the result of the reaction member being in the first gearset.

In one example, it is possible to compound a planetary gearset such that its normal braked reaction member is made to rotate in one direction only relative to the input direction of the gearset. The second gearset is generally a simple gearset with one brake. In this disclosure, however, the embodiments described herein may compound a planetary gearset such that its normal braked reaction member is made to rotate in both directions relative to the input direction of the gearset. This would otherwise require a third or fourth simple planetary gearset with the associated clutches or brakes.

It has been found that the benefit of rotating the gearset's normally braked member in both the same and opposite directions as the gearset input is the ability to add both deeper and shallower gear ratios or speeds to the transmission as opposed to just adding one or the other. This ability can be applied with the transmission in reverse as well. In order to achieve this, the transmission 200 of FIG. 2 is designed such that the carrier output is located in the front of the carrier. By doing so, this facilitates feeding the output of the second planetary gearset 207 back to the first ring gear 210 in order to accomplish the compounding of the first planetary gearset 206. The short pinion gears, i.e., the second set of pinion gears 226, and the second ring gear 220 are positioned to the rear end of the long pinion gears, the first set of pinion gears 224.

In addition, the reaction sun gear 218 is positioned to the rear of the long pinion gears 224. As such, the reaction sun gear 218 is able to mesh with the short pinion gears 226. The reaction sun gear 218 therefore is connected to the fourth brake 250.

In the aforementioned embodiment of the transmission 200, the input sun gear 216 is connected to the first carrier member 212, which is the output of the first planetary gearset 206. The first sun gear 208 functions as the input of the first planetary gearset 206. Thus, the output of the first planetary gearset 206 becomes the input to the second planetary gearset 207. Moreover, the output of the second planetary gearset 207 is configured as the second carrier member 222, which feeds torque to the first ring gear 210 to complete the compounding action.

An advantage of the embodiment of FIG. 2 is the ability to incorporate the second planetary gearset 207 in an add-on housing 201 to the rear of the transmission 200. In other words, the dashed line that separates a first portion A may be from an existing transmission 200 from a second portion B which includes the add-on housing 201 and the compound planetary or Ravigneaux-type gearset 207. By doing this, the existing arrangement of components including the first planetary gearset 206 of the transmission 200 may be uninterrupted and connected to the components of the add-on housing 201. Although the add-on housing 201 is shown being mounted to a rear portion of the transmission 200, it is further possible the add-on housing 201 may be mounted at other portions of the transmission 200.

During forward operation and with the embodiment of FIG. 2 including the first torque-transmitting mechanism 240 and the fourth torque-transmitting mechanism 246, fifth torque-transmitting mechanism 248, or the sixth torque-transmitting mechanism 250 engaged or applied, the transmission 200 is capable of adding at least one forward and one reverse speed or gear ratio that are both deeper (i.e., higher numerical gear ratio) than the existing ratios resulting from applying the third torque-transmitting mechanism 244. Further, this combination is capable of adding at least two forward and two reverse transmission speeds or gear ratios that are shallower or faster (i.e., smaller numerical gear ratio) than the existing ratios resulting from applying the third torque-transmitting mechanism 244.

In another embodiment, the second torque-transmitting mechanism 242 is engaged or applied rather than the first torque-transmitting mechanism 240. Here, the second carrier member 222 is an input, and applying the second torque-transmitting mechanism 242 and the fourth torque-transmitting mechanism 246, fifth torque-transmitting mechanism 248 or sixth torque-transmitting mechanism 250 may provide two added forward and one added reverse transmission speed or gear ratio that are considered overdrives. In effect, a total of five added forward speeds and four added reverse speeds may be achieved with the add-on housing 201 of FIG. 2.

Gear ratios involving the fourth torque-transmitting mechanism 246 may be adjusted without affecting the gear ratios involving the fifth or sixth torque-transmitting mechanisms. The same is true for the gear ratios involving the fifth and sixth torque-transmitting mechanisms.

In a further embodiment, up to any two of the fourth, fifth, and sixth torque-transmitting mechanisms and their associated connected gears may be omitted or removed from the add-on housing 201 with the associated reduction in added transmission speeds or gear ratios.

While exemplary embodiments incorporating the principles of the present disclosure have been disclosed hereinabove, the present disclosure is not limited to the disclosed embodiments. Instead, this application is intended to cover any variations, uses, or adaptations of the disclosure using its general principles. Further, this application is intended to cover such departures from the present disclosure as come within known or customary practice in the art to which this disclosure pertains and which fall within the limits of the appended claims.

The invention claimed is:

1. A multiple speed transmission, comprising:
an input shaft;
an output shaft;
a first planetary gearset having a first member, a second member, and a third member;
a second planetary gearset having a first member, a reaction member, a second member, a third member, and a fourth member;
a plurality of interconnecting members each connected between at least one of the first and second planetary gearsets and at least another of the first and second planetary gearsets;
a first torque-transmitting mechanism selectively engageable to interconnect the input shaft with the first member of the first planetary gearset;
a second torque-transmitting mechanism selectively engageable to interconnect the input shaft with the third member of the first planetary gearset and the second member of the second planetary gearset;
a third torque-transmitting mechanism selectively engageable to interconnect the third member of the first planetary gearset and the second member of the second planetary gearset with a stationary member;
a fourth torque-transmitting mechanism selectively engageable to interconnect the third member of the second planetary gearset with the stationary member;
a fifth torque-transmitting mechanism selectively engageable to interconnect the fourth member of the second planetary gearset with the stationary member;
a sixth torque-transmitting mechanism selectively engageable to interconnect the reaction member of the second planetary gearset with the stationary member;
wherein the torque transmitting mechanisms are selectively engageable in combinations of at least two;
wherein, the selective engagement of two of the first, second, and third torque-transmitting mechanisms establishes X number of forward speed ratios and Y reverse speed ratios between the input and output shafts;
further wherein, the selective engagement of one of the first and second torque-transmitting mechanisms and one of the fourth, fifth and sixth torque-transmitting mechanisms adds five additional forward speed ratios to X number of forward speed ratios and adds four reverse speed ratios to Y number of reverse speed ratios between the input shaft and the output shaft.

2. The multiple speed transmission of claim 1, wherein the output shaft is continuously interconnected with the second member of the first planetary gearset and the first member of the second planetary gearset.

3. The multiple speed transmission of claim 1, wherein the plurality of interconnecting members includes a first interconnecting member directly connected to the first member of the first planetary gearset.

4. The multiple speed transmission of claim 1, wherein the plurality of interconnecting members includes a second interconnecting member continuously interconnecting the third member of the first planetary gearset with the second member of the second planetary gearset.

5. The multiple speed transmission of claim 1, wherein the plurality of interconnecting members includes a third interconnecting member directly connected to the third member of the second planetary gearset.

6. The multiple speed transmission of claim 1, wherein the plurality of interconnecting members includes a fourth interconnecting member directly connected to the fourth member of the second planetary gearset.

7. The multiple speed transmission of claim 1, wherein the plurality of interconnecting members includes a fifth interconnecting member directly connected to the reaction member of the second planetary gearset.

8. The multiple speed transmission of claim 1, wherein the second member of the second planetary gearset comprises a first set of pinion gears and a second set of pinion gears meshing with one another, where the first set of pinion gears meshes with the first member of the second planetary gearset and the second member of the second planetary gearset, and the second set of pinion gears meshes with the third member of the second planetary gearset and the reaction member of the second planetary gearset.

9. The multiple speed transmission of claim 1, wherein the first planetary gearset is disposed within a transmission housing and the second planetary gearset is disposed within an add-on housing, the add-on housing being mounted to the transmission housing.

10. The multiple speed transmission of claim 1, wherein:
the first member of the first planetary gearset comprises an input to the first planetary gearset and the second member of the first planetary gearset comprises an output of the first planetary gearset;
the first member of the second planetary gearset comprises an input to the second planetary gearset and the second member of the second planetary gearset comprises an output of the second planetary gearset;
the output of the second planetary gearset is connected to the third member of the first planetary gearset to form a second input to the first planetary gearset.

11. The multiple speed transmission of claim 1, wherein:
the first members of the first and second planetary gearsets and the reaction member of the second planetary gearset comprise sun gears;
the second member of the first and second planetary gearsets comprise carrier members; and
the third members of the first and second planetary gearsets and the fourth member of the second planetary gearset comprise ring gears.

12. A multiple speed transmission, comprising:
an input shaft;
an output shaft;
a first planetary gearset having a sun gear, a carrier member, and a ring gear;
a second planetary gearset having a sun gear, a reaction member, a carrier member, a first ring gear, and a second ring gear;
a plurality of interconnecting members each connected between at least one of the first and second planetary gearsets and at least another of the first and second planetary gearsets;
a first torque-transmitting mechanism selectively engageable to interconnect the input shaft with the sun gear of the first planetary gearset;
a second torque-transmitting mechanism selectively engageable to interconnect the input shaft with the ring gear of the first planetary gearset and the carrier member of the second planetary gearset;
a third torque-transmitting mechanism selectively engageable to interconnect the ring gear of the first planetary gearset and the carrier member of the second planetary gearset with a stationary member;
a fourth torque-transmitting mechanism selectively engageable to interconnect the first ring gear of the second planetary gearset with the stationary member;
a fifth torque-transmitting mechanism selectively engageable to interconnect the second ring gear of the second planetary gearset with the stationary member;
a sixth torque-transmitting mechanism selectively engageable to interconnect the reaction member of the second planetary gearset with the stationary member;
wherein the torque transmitting mechanisms are selectively engageable in combinations of at least two;
wherein, the selective engagement of two of the first, second, and third torque-transmitting mechanisms establishes X number of forward speed ratios and Y reverse speed ratios between the input and output shafts;
further wherein, the selective engagement of one of the first and second torque-transmitting mechanisms and one of the fourth, fifth and sixth torque-transmitting mechanisms adds five additional forward speed ratios to X number of forward speed ratios and adds four reverse speed ratios to Y number of reverse speed ratios between the input shaft and the output shaft.

13. The multiple speed transmission of claim 12, wherein the output shaft is continuously interconnected with the carrier member of the first planetary gearset and the input member of the second planetary gearset.

14. The multiple speed transmission of claim 12, wherein the plurality of interconnecting members includes a first interconnecting member directly connected to the sun gear of the first planetary gearset.

15. The multiple speed transmission of claim 12, wherein the plurality of interconnecting members includes a second interconnecting member continuously interconnecting the ring gear of the first planetary gearset with the carrier member of the second planetary gearset.

16. The multiple speed transmission of claim 12, wherein the plurality of interconnecting members includes a third interconnecting member directly connected to the first ring gear of the second planetary gearset.

17. The multiple speed transmission of claim 12, wherein the plurality of interconnecting members includes a fourth interconnecting member directly connected to the second ring gear of the second planetary gearset.

18. The multiple speed transmission of claim 12, wherein the plurality of interconnecting members includes a fifth interconnecting member directly connected to the reaction member of the second planetary gearset.

19. The multiple speed transmission of claim 12, wherein the carrier member of the second planetary gearset comprises a first set of pinion gears and a second set of pinion gears meshing with one another, where the first set of pinion gears meshes with the sun gear of the second planetary gearset and the first ring gear of the second planetary gearset, and the second set of pinion gears meshes with the second ring gear of the second planetary gearset and the reaction member of the second planetary gearset.

20. The multiple speed transmission of claim 12, wherein:
the sun gear of the first planetary gearset comprises an input to the first planetary gearset and the carrier member of the first planetary gearset comprises an output of the first planetary gearset;
the sun gear of the second planetary gearset comprises an input to the second planetary gearset and the carrier member of the second planetary gearset comprises an output of the second planetary gearset;
the output of the second planetary gearset is connected to the ring gear of the first planetary gearset to form a second input to the first planetary gearset.

* * * * *